United States Patent [19]

Knakowski et al.

[11] Patent Number: 4,679,026
[45] Date of Patent: Jul. 7, 1987

[54] CAR RADIO THEFT ALARM SYSTEM

[75] Inventors: Rolf Knakowski, Hildesheim; Dieter Fahlbusch, Diekholzen, both of Fed. Rep. of Germany

[73] Assignee: Blaupunkt-Werke GmbH, Hildesheim, Fed. Rep. of Germany

[21] Appl. No.: 799,028

[22] Filed: Nov. 18, 1985

[30] Foreign Application Priority Data

Nov. 30, 1984 [DE] Fed. Rep. of Germany ....... 3443650

[51] Int. Cl.$^4$ ............................................ G08G 13/14
[52] U.S. Cl. ..................................... 340/63; 340/568;
200/61.58 R; 455/346
[58] Field of Search ........................ 340/63, 568, 570;
455/345, 346; 307/10 AT; 200/61.19, 61.58 R

[56] References Cited

U.S. PATENT DOCUMENTS

| | | | |
|---|---|---|---|
| 408,992 | 8/1889 | Schmidt | 340/570 X |
| 2,955,282 | 10/1960 | Boyle et al. | 340/570 X |
| 3,917,372 | 11/1975 | Selinko | 455/346 X |
| 4,035,765 | 7/1977 | Wenner et al. | 340/63 |
| 4,211,995 | 7/1980 | Smith | 340/63 |
| 4,232,288 | 11/1980 | Masterman | 340/568 X |

FOREIGN PATENT DOCUMENTS 2903176 12/1983 Fed. Rep. of Germany .

Primary Examiner—James L. Rowland
Assistant Examiner—Brian R. Tumm
Attorney, Agent, or Firm—Frishauf, Holtz, Goodman & Woodward

[57] ABSTRACT

To actuate an alarm in an automotive vehicle, already present therein, upon theft of a car radio or the like, an electrical switch is formed by a leaf spring (27) secured to a reception frame (11) installed in the vehicle, and insulated therefrom. The leaf spring (24, 24') has a free contact terminal end (27, 27') which, in one embodiment (FIGS. 2, 3), is insulated from contacting the metallic frame when the radio housing (10, 15) is properly secured in the frame by engagement of springy interlock abutments (18) in reception windows (21) in the frame. When properly secured, the free ends (27) of the springs engage a contacting metallic surface (28) on the housing (15) of the radio; upon removal of the housing, the end (27) of the leaf spring (24) rides on an insulated strip and, upon total removal, remains free, so that the switch changes state, thus actuating the alarm; in accordance with another embodiment (FIGS. 4, 5), the leaf spring (27) is lifted off from engagement with the frame by the deflectable holding springs (18) on the radio when the radio is properly installed and, upon removal, makes contact with the frame. Preferably, the contact terminals are coated with a non-corroding contact material to insure reliable operation.

8 Claims, 5 Drawing Figures

CAR RADIO THEFT ALARM SYSTEM

The present invention relates to a theft alarm system, and more particularly to a theft alarm system to provide an alarm if an accessory apparatus installed in the dashboard of an automotive vehicle, particularly such as a radio, radio/cassette, or other audio equipment, is being removed from the vehicle by an unauthorized person.

BACKGROUND

Many vehicles—and as used herein, this includes not only automotive vehicles but also boats and any other conveyances—are equipped with expensive and high-quality audio reproduction equipment. For simplicity, hereinafter, such equipment will be referred to as "car radios", although, of of course, it will be understood that the equipment may include cassette recorders, citizen band (CB) equipment, and many other types of accessory equipment.

It is customary to install accessory equipment, such as car radios, in mounting frames, which are secured to the dashboard or otherwise in the vehicle, by pushing the radio into the mounting frame. The radio and mounting frame are formed with snap-in interlocks. For installation of specific types of radios in the mounting frame, for repair or replacement and the like, the interengaging snap-in connection can be released by inserting suitable tools through appropriate openings and accessible, for example upon removal of an escutcheon, from the face plate of the radios.

Theft of car radios, and particularly high-quality electronic equipment is an increasingly serious problem. If a thief gains entrance into a vehicle—which is not excessively difficult—it is possible to remove the car radio by sliding it out of its frame by overriding the interengaging snap-in connection. The snap-in connection cannot be made too complex in order to permit ready interchange of the accessory apparatus for repair by release jigs or tools of comparatively simple construction. A "professional" thief can have access to such release tools, or fashion such tools himself, for rapid removal for car radios.

Many vehicles, particularly vehicles left unattended overnight, and especially expensive vehicles, include theft alarms which provide visual and/or auditory signals if the car is drive away or the ignition switch is overriden.

THE INVENTION

It is an object to provide a simple reliable electronic theft alarm system which is readily connectable to an existing alarm system and which provides an alarm signal, for example, triggering an exisitng theft alarm, if the accessory equipment is removed from the frame. The intention, of course, is to call attention to a theft taking place at a specific vehicle, to thereby alert the owner and/or other people in the area that an unauthorized removal of electrical equipment from a vehicle is taking place. The system, additionally, should continue to provide the alarm after the material has been removed, within the time limits set by the overall alarm system, in accordance with governmental regulations.

Briefly, the car radio or accessory apparatus is formed with a housing, received in a frame, the housing and frame being connected into an electrical circuit which, in turn, is connected to trigger an alarm apparatus, the housing and frame forming a switch which changes state upon relative movement of the housing of the accessory apparatus and the receiving frame, to thereby actuate the alarm apparatus upon movement of the housing of the accessory apparatus in a direction of removal from the frame.

In accordance with a feature of the invention, the switch can be coupled to a "normally closed" relay which is connected into the alarm system, the housing and frame establishing an electrical circuit to energize the relay, and thus disable the alarm, when the housing and frame are properly located and retained in position. Only small removal movement of the housing from the frame breaks the contact—for example by permitting one of the switch contacts to ride over an insulated strip, thus causing the relay to become deenergized, the relay terminals to close, and the alarm to be triggered. In accordance with another feature of the invention, the system can be reversed so that, upon removal movement, a switch contact engaged by the housing closes an electrical circuit, thus providing a signal to trigger the alarm or, directly, connecting the alarm.

In accordance with a feature of the invention, the structural elements already present, namely the housing for the car radio or other accessory apparatus and the mounting frame are utilized directly, thereby not requiring additional vehicular structural arrangements. These elements then are so constructed that they will form an electric switch or, more precisely, the contact terminals of a switch which is operated by movement of the housing of the car radio out of the frame, thus energizing the alarm system of the vehicle.

The alarm system can be in accordance with any well known arrangement, for example an acoustic alarm horn, or additionally optically, for example by flashing the lights of the vehicle. Alternatively, the electrical switch can control the already present warning horn of the vehicle. When additionally providing illumination, for example flashing illumination, the vehicle can be readily located, for example at night, or in densely occupied parking areas.

The housing of the apparatus and the frame are usually essentially inaccessibly located behind the dashboard of the vehicle; only the front dial and operating knobs are located on a plastic front plate. It is, thus, practically impossible to override the electrical switches which are operated by the housing-frame combination due to the inaccessibility of those components, when properly assembled. Likewise, the switch cannot be started due to toying therewith, for example by passengers in the vehicle, since the switch components are inaccessibly located in the vehicle. The system is "armed" upon insertion of the radio into the frame, and, already upon only small relative shiftable movement, triggers the alarm, which will remain effective and connected after complete removal of the radio from the frame. The alarm cannot be interrupted anymore after the radio has been entirely removed.

The modification of the frame to receive the radio and of the housing of the radio itself to form a cooperating electrical switch thereof requires only minor modification of the structural elements which are already used and can be provided without any modification of the electrical structure of the radio as such, so that no modification of the radio circuitry is required.

In accordance with a feature of the invention, the contact surfaces are specifically shaped to provide for reliable contact engagement even after years of undisturbed installation; if desired, the contact surfaces may be coated with non-corrosive contact materials so that, even over the years, the theft alarm remains effective and immediately operable.

DRAWINGS

DETAILED DESCRIPTION

Figure 1:
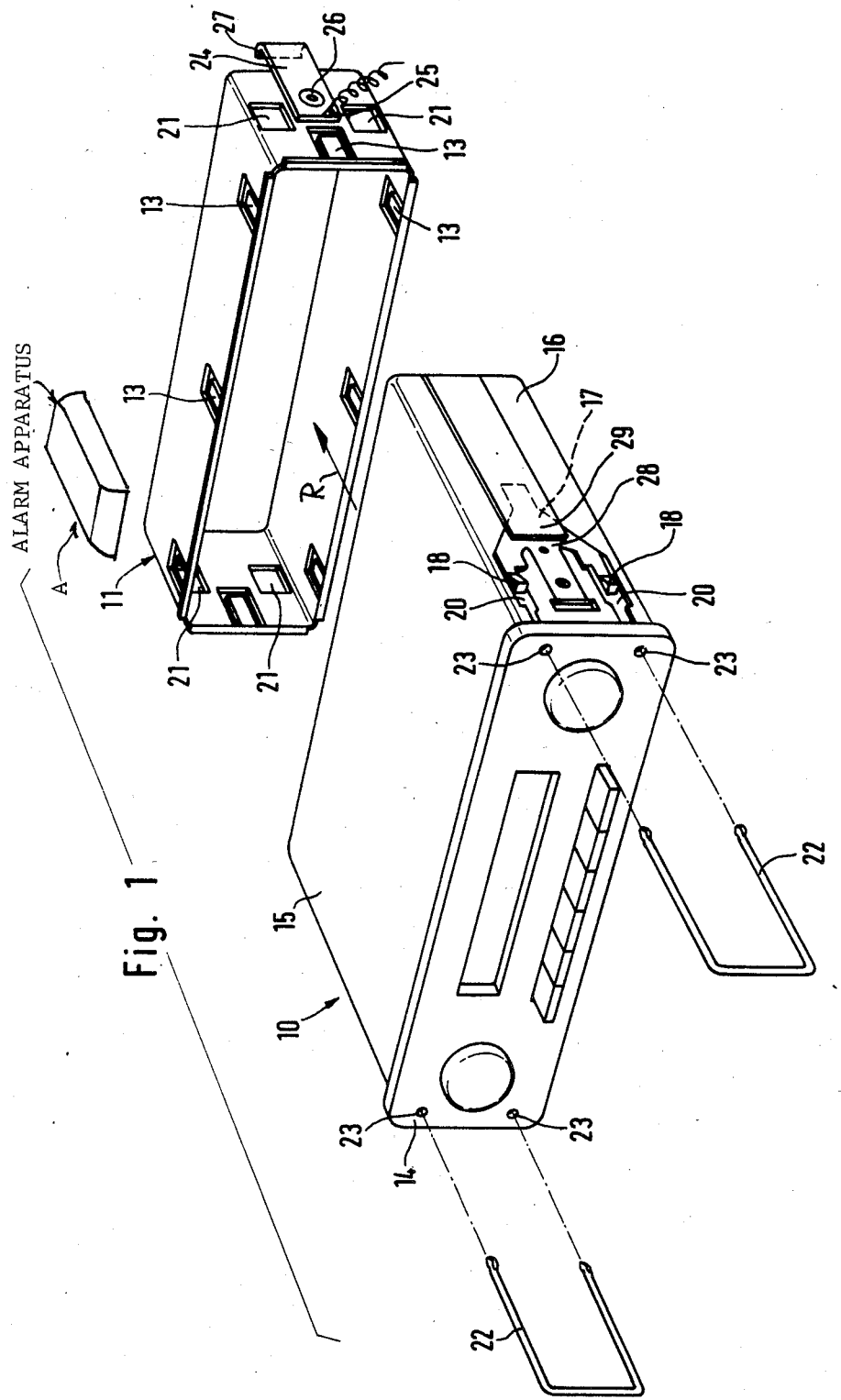
FIG. 1 is an exploded view of a car radio and frame and illustrating the placement of the radio in the frame.

FIG. 1 is a general illustration of an accessory apparatus, for example a radio 10, which can be introduced, in the direction of the arrow R, into a box-like frame 11. The box-like frame, typically, is of metal, and open towards the rear. The box-like frame may, itself, be secured into an opening of the dashboard 12 (FIGS. 2-5) in any suitable manner, for example by spring flaps or ears 13. Frame 11 cannot be removed from the front of the dashboard 12. The frame 11 may, also, be unitary with the dashboard, or, otherwise, secured in the vehicle.

The entire housing 15 of the radio 10 is made of metal, or metallized plastic, for shielding purposes. Only the front plate 14, carrying the scales and control knobs or buttons may be made of plastic or other materials. The housing 15 of the radio 10 and the frame 11 are connected to ground or chassis voltage of the vehicle which, in turn, as is customary, is connected to the negative terminal of the vehicle battery. If the wall 12—see FIG. 2—of the vehicle dashboard is made of plastic, a ground or chassis connection for frame 11 must be established.

The housing 15 is formed at its two side walls 16 with engagement projections 18 carried by a common spring 17. The engagement projections 18 are so arranged that upon insertion of the radio 10 into the frame 11, the projections 18 can deflect inwardly into holes 20 of the side walls 16. When the radio 10 is fully inserted in the frame, they can snap into mutually fitted engagement windows or openings 21 formed in the frame 11. The radio, thus, is irremovably held within the frame 11. The snap connection of the projections 18, which are formed with abutment surfaces facing forwardly, can be released by engaging four pins, or a pair of bails 22 through holes 23 formed in the front plate of the radio with the springs 17 or projections 18, to withdraw the projections 18 from the engaging windows 21 of the frame 11, that is, to push them back into the openings 20 of the side walls 16. The release is shown, for example, in FIG. 5. Upon pushing back the projections 18 into the openings 20 of the side walls of the radio, the radio can readily be removed from the frame 11. This arrangement to secure a radio in place is known, and has been in use for some time, see for example German Pat. No. 29 03 176.

In accordance with the present invention, the structural elements are used to additionally, besides their mechanical engagement, form an electrical switch for an alarm circuit.

Figure 2:
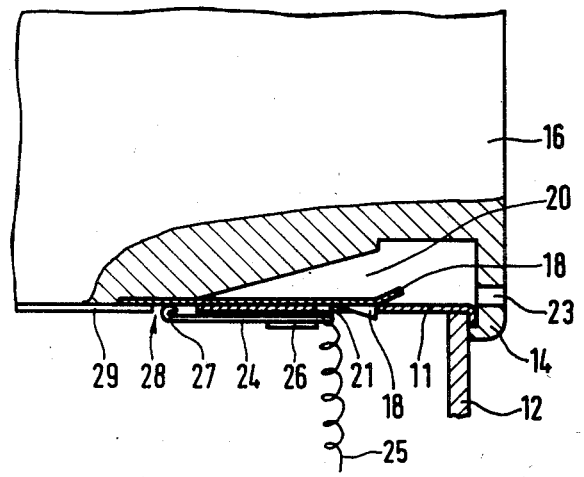
FIG. 2 is a partly broken away, partly sectional, side view of the frame, with the radio fully inserted, and using an electrical switch which, with the radio inserted, is in a base, non-signal emitting position.

In the embodiment of FIGS. 1 and 2, a leaf spring 24 is located approximately centrally between the windows 21 on the side wall of the frame 11. An electrical terminal 25 is connected to the vehicular alarm system. A rivet 26 retains the leaf spring 24, insulated from the frame 11, for example by interposition of an insulating fiber washer or the like on the frame 11. The free end of the leaf spring 24 forms a switch terminal. It is angled off towards the inside, as seen at 27. Preferably, the angled-off portion is formed as a rolled or continuously bent terminal end to form a surface or at least broad line contact region. Upon full insertion of the radio 10 into the frame 11, and engagement of the engagement projections 18 into the windows 21, the end 11 will engage a metallized contact terminal surface 28 formed, for example, on the spring element 17. The spring connection of the leaf spring 27 against the spring element 18 will be a good, electrically continuous resiliently biassed connection. The spring 17 forms the second switch terminal or contact.

A flat insulating strip 29, for example, an insulating plastic strip adhesive on one side, is adhered on the side wall 16 of the housing 10, terminating just short of the contact surface 28.

Operation:

Upon release of the projections 18, and removal of the radio 10 from the frame 11, the previously electrical continuous circuit between the spring 24 and its end 27 on the terminal engagement contact surface 28 will be interrupted as the terminal 27 runs on the insulating strip 29. The engagement with the insulating strip 29 will occur upon only slight movement in removal direction. Thus, electrical contact between the spring 24 and the contact surface 28 is interrupted. The switch will have changed state, which is sensed by a relay, for example normally closed (NC), that is, closed when deenergized. Upon deenergization, due to the terminal 27 being separated from terminal 28, the relay will close, thus closing an alarm circuit and providing an alarm, in accordance with an already installed and standard alarm apparatus or system A. This alarm will persist even upon complete removal of the radio 10 since, then, there will be no counter terminal for the spring 24 with its contact 27 at all.

The system is fail-safe, that is, if there should be corrosion of the elements forming the switch terminals, contact surface 28 and terminal end 27, the alarm A will become operative. The owner can then disable the alarm—in accordance with usual disabling switches being provided, and an authorized service station can remove the radio, clean the terminals, and reinsert it.

In accordance with a second embodiment of the invention, the electrical circuit can be reversed. This is inherently a simpler system. Referring to FIGS. 4 and 5: The insulating strip 29 is not used. Rather, a contact spring 24', secured by a rivet 26', is connected to the frame 11. The contact spring 24', in this embodiment, faces forwardly, that is, is rotated by 180° with respect to the contact spring 24 of FIGS. 2 and 3. Contact spring 24 is electrically insulated from the frame 11 and so positoned that it fits over a window 21. The end portion is so placed that it can engage the frame 11 and close an electrical alarm circuit, unless lifted off from engagement with the frame 11 by one of the projections 18 on the radio.

Operation: Upon insertion of the radio 10, the projections 18 will snap into the windows 21 and will lift off the contact strip 24' from engagement with the frame 11, thus breaking any electrical circuit between the terminal connection 25 and the frame 11 since, as noted, the spring 24 is secured to the frame 11 in insulated relation. The insulating washers are standard, and have been omitted from the drawing for ease of illustration, since they are extremely thin. If a removal tool 22—see FIG. 5—is introduced into one of the removal openings 23 of the front plate 14, thus depressing the engagement projection 18 from the window 21 into the release opening 20 of the side wall 16 of the radio, to permit removal of the radio 10 from the frame 11, the contact spring 24 can deflect and become unstressed and the free terminal end 27 can then engage the frame 11 to close an electrical contact: 25—24'—27'—11, to establish a continuous circuit which, again, due to change-of-state of the switch terminals 27'—11 energize and operate an alarm system. Upon total removal of the radio, this switch 27'—11 will remain closed and will continue to furnish an alarm signal until either a timing circuit has determined that the alarm time has elapsed, or the system is manually reset, for example by an authorized operation of an alarm—disable switch.

The respective contact surfaces 27, 28 and 27'—11 may be formed with special terminal coatings to prevent corrosion and long-term stability of continuity of electrical contact, when required.

Figure 3:
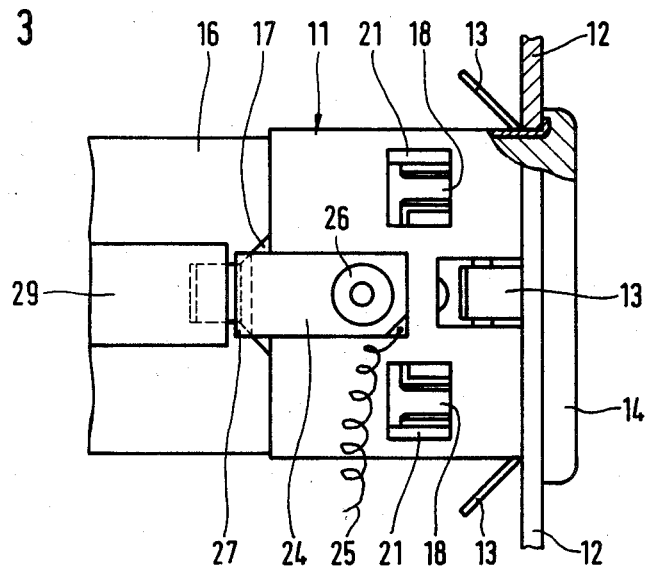
FIG. 3 is a fragmentary side view of the arrangement of FIG. 2.
Figure 4:
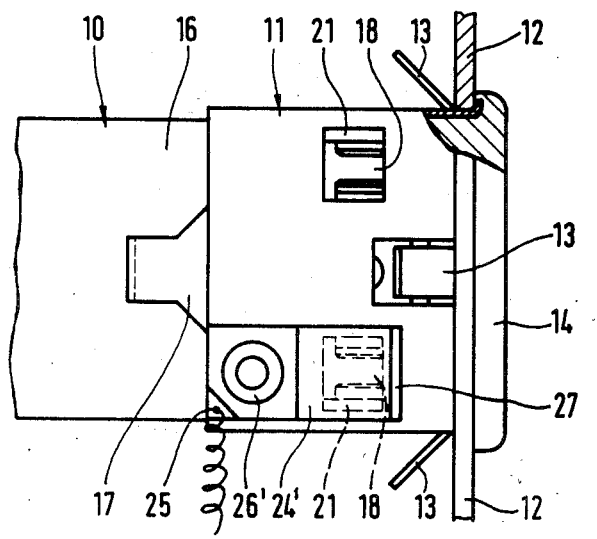
FIG. 4 is a fragmentary side view of a frame with a radio inserted therein, having an electrical switch which is energized upon removal of the radio.
Figure 5:
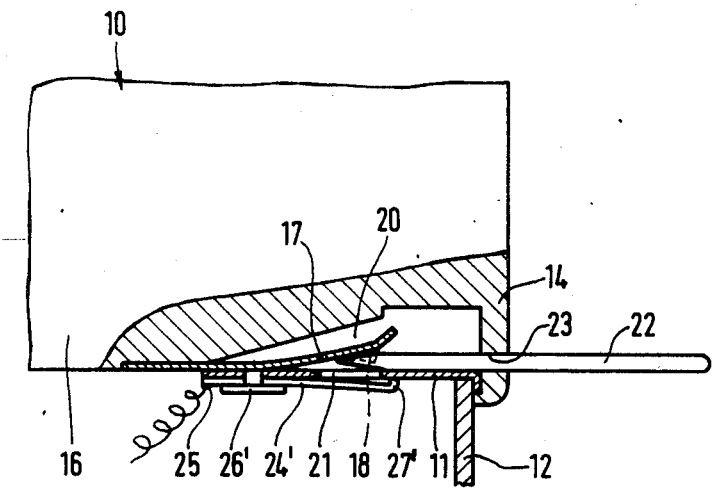
FIG. 5 is a fragmentary, partly cut away top view of a radio fitted in a frame and illustrating insertion of a removal tool to remove the radio, and the resulting closing of the electrical switch.

In the embodiment of FIGS. 2 and 3, the spring contact can be continuously biassed towards the radio 10; in the embodiment of FIGS. 4 and 5, the spring contact is lifted off a quiescent position when the radio is inserted and the spring relaxes against the side wall 11 upon removal of the radio. The embodiment of FIGS. 4 and 5 can be connected directly into the alarm circuit and does not require a relay. The relay may be electronic or electromagnetic as desired. In either case, a slight shift of the radio from the frame will energize the alarm circuit; in the embodiment of FIGS. 4 and 5, the mere attempt to remove the radio by insertion of the removal tool will already trigger the alarm. The radio itself need not be modified at all in the embodiment of FIGS. 4 and 5, and in the embodiment of FIGS. 2 and 3, the only modification required is the addition of the insulating strip 29, which can be an adhesively coated strip of insulating tape. Deforming the end portions 27, 27' of the contact elements on the frame has the advantage that the radio can be easily slid into the frame, the end portion sliding over openings, corrugations or other discontinuities on the housing of the radio 10. A rounded shape is preferred.

We claim:

1. Electric theft alarm system for accessory apparatus installed in a vehicle, particularly automobile audio apparatus in which the accessory apparatus includes a housing (15), and the vehicle has an alarm apparatus, and a receiving frame (11) is provided within the vehicle for telescopically receiving the housing (15) of the accessory apparatus, said receiving frame and the accessory apparatus being formed with releasable engagement means (17, 18, 21) for securing the accessory apparatus in the frame and hence in the vehicle, wherein, in accordance with the invention, the housing (15) of the accessory apparatus and the receiving frame (11) are connected into an electrical circuit, coupled to the alarm apparatus, and form a switch which changes state upon relative movement of the housing of the accessory apparatus and the receiving frame to actuate the alarm apparatus upon movement of the housing of the accessory apparatus in a direction of removal from the frame, wherein the switch includes a contact leaf spring (24) having a free end (27), which free end is bent or bowed out of the major plane of the leaf spring, said bent or bowed end forming a switch terminal contact.

2. Theft alarm according to claim 1, wherein said bent or bowed end (27) and an electrically conductive surface forming a counter switch terminal surface are coated with non-corroding electrical terminal contact material.

3. Electric theft alarm system for accessory apparatus installed in a vehicle, particularly automobile audio apparatus in which the accessory apparatus includes a housing (15), and the vehicle has an alarm apparatus, and a receiving frame (11) is provided within the vehicle for telescopically receiving the housing (15) of the accessory apparatus, said receiving frame and the accessory apparatus being formed iwth releasable engagement means (17, 18, 21) for securing the accessory apparatus in the frame and hence in the vehicle, wherein, in accordance with the invention, the housing (15) of the accessory apparatus and the receiving frame (11) are connected into an electrical circuit, coupled to the alarm apparatus, and form a switch which changes state upon relative movement of the housing of the accessory apparatus and the receiving frame to actuate the alarm apparatus upon movement of the housing of the accessory apparatus in a direction of removal from the frame, wherein a contact spring (24) is provided, secured in insulated relation with respect to the vehicle on the frame (11), connected in said electrical circuit, and forming one terminal or contact of said switch, the contact spring (24) having a free end (27) and the housing (15) having a small electrically conductive surface (28) positioned for engagement by the free end (27) of the contact spring when the housing of the accessory apparatus is received in the frame and locked therein by said interengagement means, and an insulating surface (29) located adjacent the conductive surface (28) and positioned for engagement by said contact spring upon movement of the housing (15) of the accessory apparatus in the direction of removal from the frame, thereby interrupting the electrical contact between the small surface (28) on the accessory apparatus and the free end (27) of the contact spring, causing the switch to change switching state.

4. Theft alarm according to claim 3, wherein the frame is electrically conductive and the insulating contact spring (24) is secured thereto by an insulating attachment;

and wherein the housing is electrically conductive, and said insulating surface comprises a strip of insulating material secured to the electrically conductive housing immediately adjacent said small contact surface (28) and extending longitudinally of the housing.

5. Theft alarm according to claim 3 wherein the insulating surface comprises a slide surface located longitudinally along the length of the housing (15) of the accessory apparatus.

6. Electric theft alarm system for accessory apparatus installed in a vehicle, particularly automobile audio apparatus in which the accessory apparatus includes a housing (15), and the vehicle has an alarm apparatus, and a receiving frame (11) is provided within the vehicle for telescopically receiving the housing (15) of the accessory apparatus, said receiving frame and the accessory apparatus being formed with releasable engagement means (17, 18, 21) for securing the accessory apparatus in the frame and hence in the vehicle, wherein, in accordance with the invention, the housing (15) of the accessory apparatus and the receiving frame (11) are connected into an electrical circuit, coupled to the alarm apparatus, and form a switch which changes state upon relative movement of the housing of the accessory apparatus and the receiving frame to actuate the alarm apparatus upon movement of the housing of the accessory apparatus in a direction of removal from the frame, wherein the interengagement means comprises resiliently deflectable springs (18) secured to the housing (15) of the accessory apparatus (10) and windows (21) formed in the frame, the resiliently deflectable springs being engageable in the windows and projecting therethrough when the accessory apparatus (10) is received within the frame for securing the apparatus in the vehicle;

an electrical contact spring (24') is provided, secured to the frame and insulated with respect to the vehicle, the contact spring (24') having a free end (27) fitting over said window (21) and forming one terminal of said switch;

and wherein the frame (11) is formed with an electrically conductive surface opposite the free end of said contact spring and forming a second switch terminal, one of the resiliently deflectable springs (18) engaging the contact spring and lifting the contact spring off the electrically conductive surface on the frame when the accessory apparatus (10) is received in the frame and locked therein by the interengagement means, deflection of the resiliently deflectable springs (18) out of the windows (21) permitting the contact spring (24') to move the free end into electrical contact engagement with the electrically conductive surface on the frame, thereby causing the switch to change state and actuating the alarm apparatus.

7. Theft alarm according to claim 6, wherein the contact spring (24, 24') is leaf spring and the free end (27, 27') is bent or bowed out of the major plane of the leaf spring, said bent or bowed end forming a switch terminal contact.

8. Theft alarm according to claim 7, wherein said bent or bowed end (27, 27') and said electrically conductive surface forming a counter switch terminal surface are coated with non-corroding electrical terminal contact material.

* * * * *